Nov. 11, 1941.   M. FUKUHARA   2,262,424
AUTOMOBILE SIGNAL AND MEANS FOR OPERATING THE SAME
Filed Jan. 8, 1940   2 Sheets-Sheet 1

INVENTOR.
MITSUO FUKUHARA
BY
ATTORNEY.

Nov. 11, 1941.　　　M. FUKUHARA　　　2,262,424
AUTOMOBILE SIGNAL AND MEANS FOR OPERATING THE SAME
Filed Jan. 8, 1940　　　2 Sheets-Sheet 2
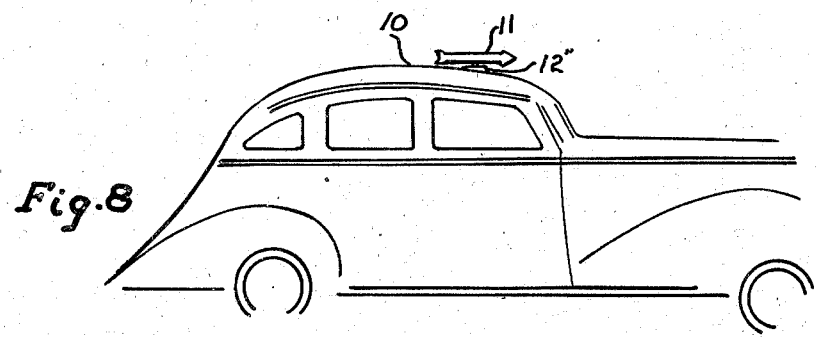
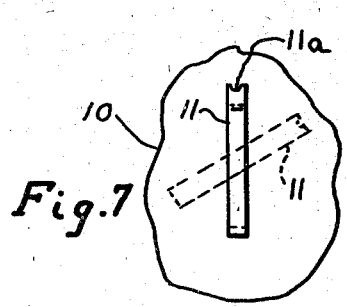
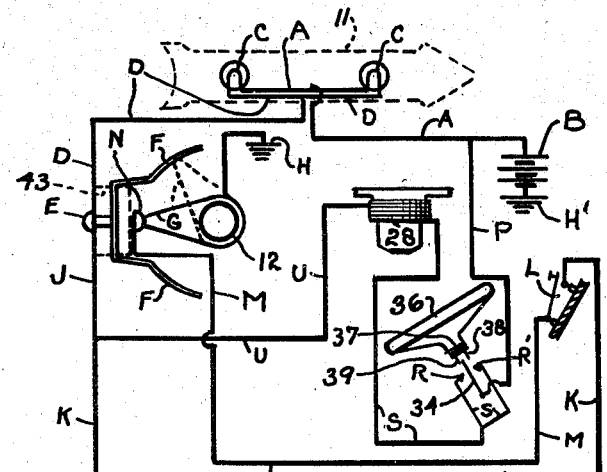
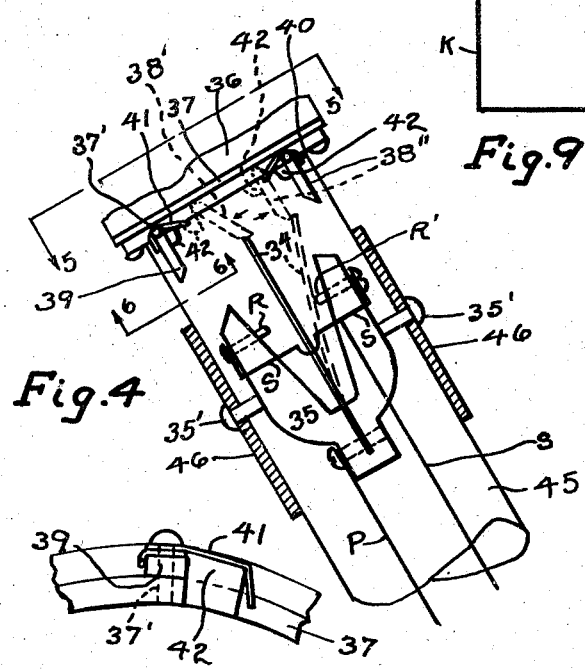
INVENTOR.
MITSUO FUKUHARA
BY G. Ward Kemp
ATTORNEY.

Patented Nov. 11, 1941

2,262,424

UNITED STATES PATENT OFFICE 2,262,424

AUTOMOBILE SIGNAL AND MEANS FOR OPERATING THE SAME

Mitsuo Fukuhara, Tacoma, Wash.

Application January 8, 1940, Serial No. 312,933

3 Claims. (Cl. 177—337)

This invention relates to signals for automobiles, and to means for operating the same. It particularly relates to improvements over devices described in Letters Patent of the United States, granted to me December 12, 1939, numbered 2,183,349, for obtaining greater efficiency with fewer parts and more easily and cheaply constructed and more easily operated.

As disclosed in said patent, it is important in the operation of automobiles, or cars, on roads and streets, to provide a signal on the top thereof, preferably in form of an arrow, to indicate the direction the driver may intend to turn to either side as into a road or street at right angles, and to provide for the automatic release of such signal when such turn has been fully completed. In such patent two side latches are shown for temporarily sustaining such arrow when pointed to either side, to be released by the turning of the steering wheel for making such turn. Experiments have shown that the forces described in said patent and others for releasing said latches, are frequently insufficient to assure such releases, owing in part to resistance provided by inherent inertia of the latches, and friction of restraining parts. It is also found that the releasing of such latches by the steering wheel when first turned to guide such car to either side results in the premature release, if at all, of such latches. Experiments have further shown, that the inertia and resistance may be overcome by the same forces named if aided by the interposition of a slight jarring impact.

Objects of the invention are therefore to provide but one latch, to be easily operated, and to provide a jarring impact to overcome such inertia, and also to provide means for releasing the latch by said wheel only on return to its forward driving position after such car has been fully turned, to either side.

Another object is to provide such signal in form of a hollow arrow, with transparent sides and openings at both ends, thereof, with light bulbs mounted in the arrow, adapted to shine through said sides and openings when electrified. A further object is to provide electric circuits for illumining said globes automatically when said arrow is turned to either side, to indicate intention to turn and to illumine said arrow when pointed forward at the option of the driver.

With these and other objects to be hereinafter described I have illustratively exemplified my invention by the accompanying drawings of which:

Figure 4 is a side elevation of a portion of the steering column with a flexible tongue, and contact points with pawls for bending the tongue to the points, Figure 5 is a plan view of the steering column and collar for operating the pawls, taken on line 5—5 of Fig. 4.

Figure 6 is a fragmentary enlarged bottom plan of the collar with a pawl and pressure spring.

Figure 9 is a schematic diagram of electrical circuits and contacts.

Figure 8 is an outline of a car with the arrow signal thereon pointing forward in normal position.

Figure 7 is a plan of the arrow pointing forward in full lines, and pointed sidewise in dotted lines.

Like characters on the different figures represent like parts: Numeral 10 represents the roof of any car, and 11 is the signal in form of a hollow arrow horizontally disposed over the car. The arrow is supported on a tubular shaft 12, which is rotatably mounted through a sleeve 13, projected through the roof and attached thereto by a flange 14 above, and a compression nut 14' beneath. Soft gaskets 14'' may be inserted above and below the roof. The bottom of the arrow is provided with a short neck 11' which is affixed over the top of the shaft by a screw 12'. The shaft is supported in such sleeve by the lower edge of the neck 11' which is rotatably positioned on top of the sleeve above the roof. Any covering at 12'', preferably with stream lined exterior may be positioned below the arrow.

Figure 1:
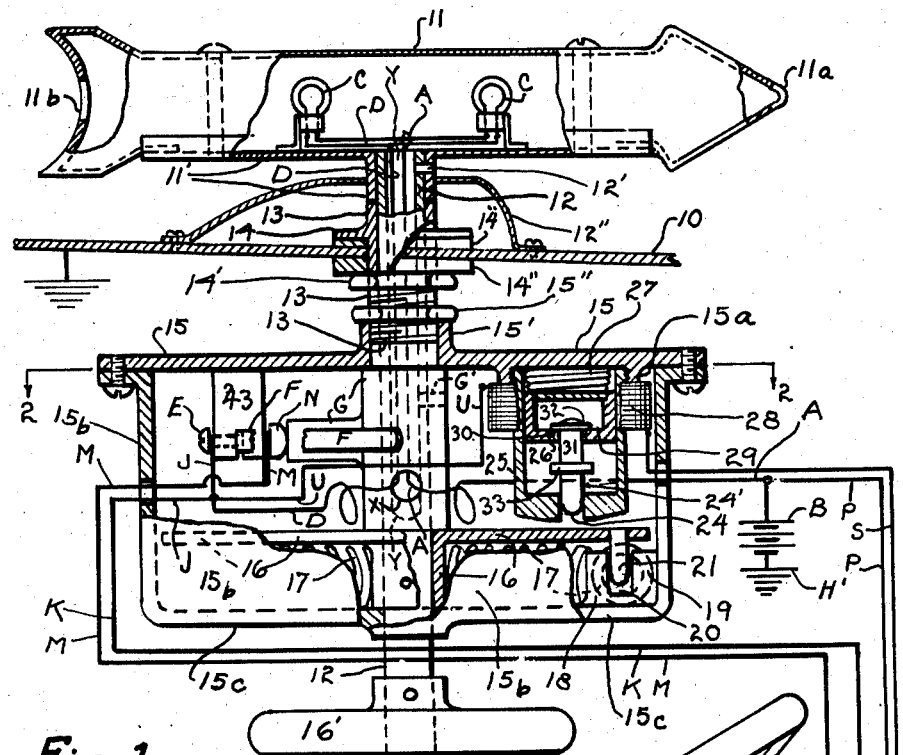
Figure 1 is a side elevation partly in section showing a signal arrow pointing forward, a housing beneath the arrow and mechanical parts adjacent with the latch upraised and a steering wheel in relative position with said parts.
Figures 2, 3:
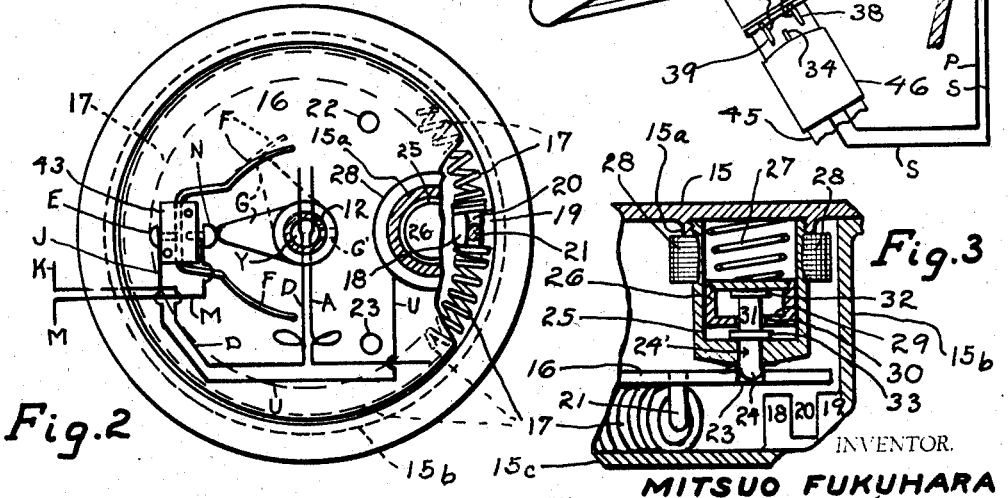
Figure 2 shows a plan of the housing and parts enclosed, taken on line 2—2 of Fig. 1, all in decreased size.
Figure 3 is a fragmentary side elevation partly in section showing the cylinder with the piston and latch depressed in a holding socket.

A circular housing with a roof 15 is provided with a nipple 15', on its top, which is connected to the lower end of the said sleeve by a nut 15'', the walls of the housing are indicated by 15a, cylinder brackets, sides, 15b, and the base 15c. The shaft 12, is rotatably extended through the housing and a handle 16' is attached to the lower end thereof for manually turning the arrow crosswise over the car to indicate a proposed turn to be made by the driver. A disc 16 is attached to the shaft and rotatably positioned within the housing in spaced relation above the base. Beneath the disc is a single coil spring 17, circularly disposed inside of the walls of the housing and supported by said base. The two ends of the spring normally abut adjacent each other but are separated by bosses 18 and 19, which are spaced apart to leave a passageway 20 between the same. A compression post 21 is projected from the lower side of the disc and adapted to pass between such bosses when the disc is turned by the shaft in either direction. When the arrow is pointed forward the post normally rests between the ends of the spring as shown in Fig. 2, between the bosses; but when the post is moved in either direction by the disc the respective end of the spring is pushed back and the entire spring compressed, but tends to return the arrow to normal position.

In order to sustain the arrow when pointed toward either side until the car is completely turned sockets 22 and 23 are provided in the disc and a latch point 24 on bolt 24' is slidably mounted above such sockets and adapted to enter one of the same for retaining the arrow sidewise. A cylinder 25 is extended downward from the top of the housing and a hollow iron piston 26 is slidably mounted in the upper portion of the cylinder and normally pressed downward by a weak spring 27. The upper portion of the cylinder is wrapped by wire coils 28, to provide an electrical magnet when energized for raising the piston against said spring 27. A floor 29 on the piston is provided with a hole 30 centrally therethrough and an upper neck 31 of the bolt is freely disposed through such hole, and a head 32 is affixed on the top of such neck. A flange 33 is extended around the bolt at the base of the neck at sufficient distance below the head to support the latch in the cylinder in spaced relation below the piston. When the cylinder is depressed the top thereof presses the head of said bolt and causes the latch point 24 to enter one of the sockets when turned beneath the same; said latch point being slidably disposed through the guide hole 30, in the bottom of the cylinder 25.

The disc is returned to normal forward position when the latch is raised by the piston; and the piston is raised by said magnet when energized by an electric circuit closed by the steering wheel as follows: A wire or line P connects the car battery B to the base of a flexible tongue 34, which is projected normally in perpendicular line from an insulation block 35, which is connected to the steering column 45 by a band 46. This tongue, however, may be bent over to either side to meet contact points R and R' to close the circuit. Said tongue is so bent by the return revolution of the steering wheel 36, and a collar thereon after the car has been first turned. Sustained beneath the collar 37 by pivots 37'' are pawls 38 and 39, beneath the collar in spaced relation from each other. Said pawls are normally retained in perpendicularly positions by weak springs 40 and 41 which press the pawls toward each other against lugs 42 carried by the collar. When the wheel is in forward position the pawls are disposed on each side of said tongue 34, but when the wheel is first revolved to turn the car one of the pawls illustratively indicated as 38 in Fig. 4, is carried against the top of the tongue 34, and is thereby tipped to one side outward until the lower point thereof is raised and then slides over the top of said tongue as shown by dotted lines 38'. After the car has been turned at right angles the movement of the wheel is reversed as usual and said pawl that has so passed over the arm is then prevented by lug 42 from tipping in the other direction and it then forces the tongue over to one side as shown in dotted lines 38'' in Fig. 4, till a contact has been made with the point R' thereby completing a circuit from the battery B to the magnet 28 through line S, thence to ground H, by lines U, J, bent post E, fingers F, and cam G, to the shaft or ground H, the latch is then raised by the magnet from the socket and the arrow is returned to forward position by the main spring 17 as stated.

It will be seen and understood that the sockets in the disc are both located on one side in front of a diameter line across said disc. Thus the arrow when retained by the latch in either of said sockets will be disposed above the car in an obtuse angle therewith as indicated in Fig. 7 and will be thereby more easily observed from various directions. The said sockets and latch are also disposed relatively as distant as practicable from a central shaft whereby the least tension against the latch points from the disc is obtained. The adaptation of the relatively long spring 17 retained in position by the disc and bosses provides a sufficient power for returning the disc to original position and is more easily compressed than a shorter spring with sufficient power for such purpose.

In action when the piston is depressed by spring 27, the point 24 of the latch is depressed in a socket and said floor of the piston is depressed below the head 32 of the bolt in spaced relation therefrom; and when the magnet first pulls the piston upward said piston floor slides upward along said neck freely and thereby gathers momentum until the head is reached. When said floor strikes said head it jolts and jars the same sufficiently to overcome the inertia and also the torsion effect of the disc against the latch. When thus loosened the latch is drawn upward by the piston floor beneath the head until the latch point is above the disc whereupon the disc is turned to first position by the spring 17.

In order to illuminate the arrow, light bulbs C are positioned therein; a cam G is affixed on the shaft 12 and rotated therewith. Normally the said cam, when the arrow is forward, is in a position shown in full lines in Fig. 2, when the shaft is turned the cam moves to the position shown by dotted lines and then contacts with fingers F or F' and completes the circuit from the battery B to ground H, through lines A, bulbs or lamps C, line D, binding post E, and said fingers F or F'.

In order to illuminate the bulbs when the arrow is pointed ahead for ordinary travel in the night time a hand switch L is provided which closes the circuit therefor from the battery B, line A, said bulb C, lines D, J, and K, switch L, and thence through line M, to the contact screw N, mounted in an insulating block 43, and thence through said cam G as shown in full line position and thence to the shaft or ground H.

Having described my invention I claim as new:

1. A signal arrow for a car to indicate the proposed turn of a car and means for turning and returning the signal, including a perpendicular shaft for manually turning the signal toward the side to which the car is to be turned, a disc attached horizontally on the shaft provided with sockets in the same, a cylinder mounted above the outer portion of the disc, a latch bolt slidably disposed through the base of the cylinder for temporarily retaining said signal obliquely across the car, a hollow piston slidably mounted in the upper portion of said cylinder, a floor in the piston provided with a hole therethrough, the upper portion of said bolt freely disposed through said hole, above said floor, a flange around said bolt beneath said piston to limit the descent of said latch bolt, a spring above the piston for normally depressing the same and said bolt point into said sockets, a head on the top of said bolt normally spaced above said floor, with means for raising the latch, and resilient means for automatically returning said signal to original position when said latch is so raised.

2. A signal to indicate the direction a car is to be turned with means for operating the signal, comprising, a bar for a signal pivotally mounted in horizontal relation over a car, a perpendicular shaft rotatably mounted beneath said signal and attached thereto for turning the same toward either side of said car, a housing surrounding the shaft, a coil spring circularly disposed over the base of the housing, bosses between the adjacent ends of said spring and spaced apart for passage way, a disc attached to said shaft and horizontally disposed over said spring and provided with two sockets therethrough, a post dependent from the base of the disc and between the ends of said spring, adapted to pass between said bosses and compress said spring, when said disc is turned toward either side, a cylinder mounted in the housing above the disc, a latch bolt slidably disposed through the base of said cylinder in line over the path way of said sockets, and adapted to enter the same, and to latch said disc, a hollow piston slidably mounted in the upper portion of said cylinder, a floor across the bottom of the piston provided with a hole therethrough, the upper end of said bolt freely positioned through said hole, a spring above said piston for depressing the same and for setting said latch in said sockets, a head on the top of said bolt normally in spaced relation above said floor, said floor being adapted to slide upward along said bolt and to strike and jar said head when said piston is raised to loosen said latch and raise the same from said socket together with means for raising said piston after said car has been turned.

3. Means for operating a signal on a car to indicate a proposed turn thereof, including a perpendicular shaft rotatably mounted for turning the signal to either side, a disc horizontally attached to the shaft provided with two sockets therethrough, a cylinder mounted over said disc, a latch bolt slidably disposed through the base of the cylinder adapted to enter said sockets for retaining said signal in sidewise position with the car, a hollow piston slidably mounted in the upper portion of said cylinder, a floor across the piston with a hole therethrough, the upper portion of said latch bolt slidably disposed through said hole, a head on the top of said bolt normally spaced above said floor with means for raising said floor to strike and jar said head and release said latch from said socket when the steering wheel of the car is turned.

MITSUO FUKUHARA.